June 2, 1959 H. J. WILKENS ET AL 2,889,501
HIGH VOLTAGE VARIABLE VACUUM CAPACITOR
Filed May 3, 1956 2 Sheets-Sheet 1
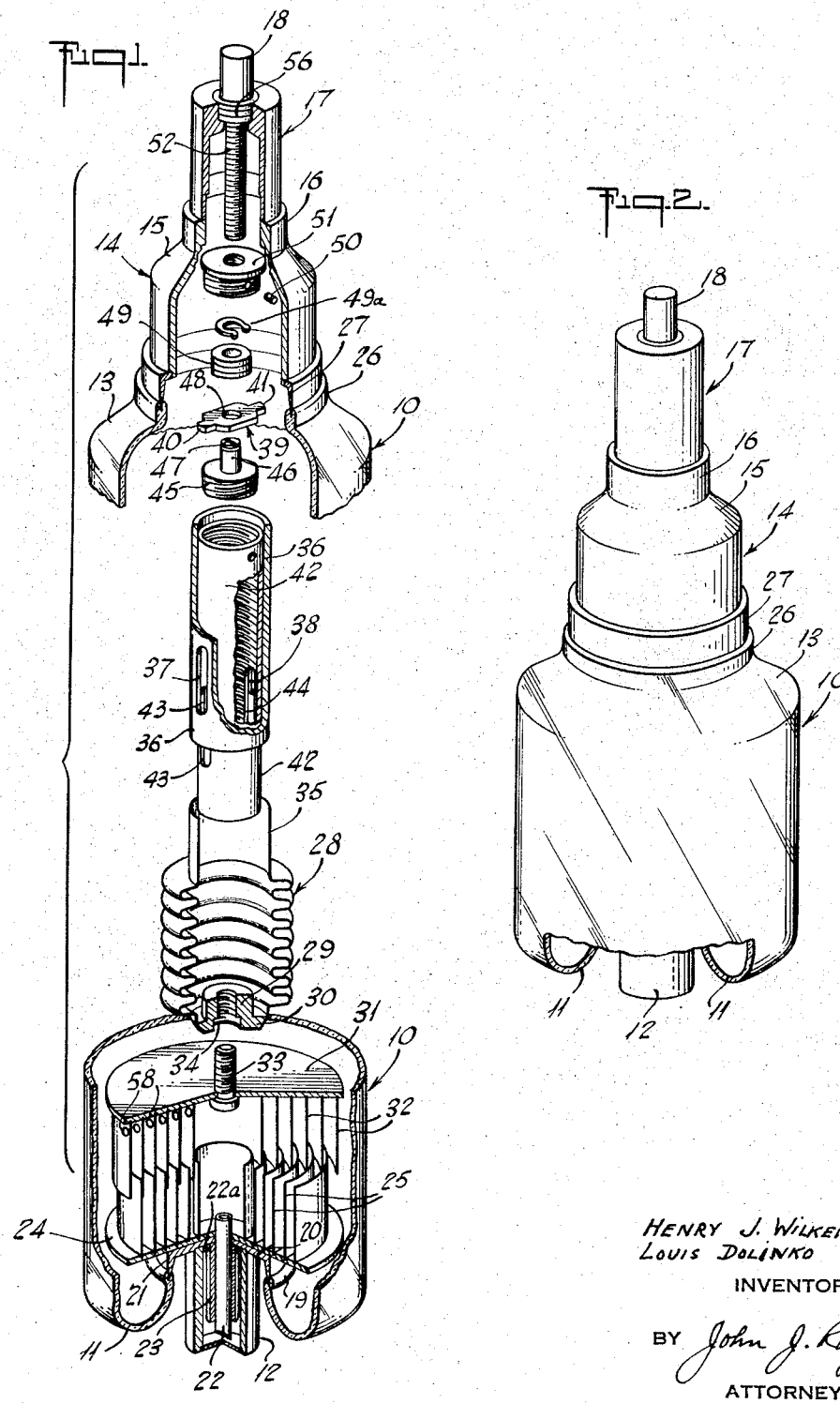
HENRY J. WILKENS
LOUIS DOLINKO
INVENTORS
BY John J. Rogan
ATTORNEY

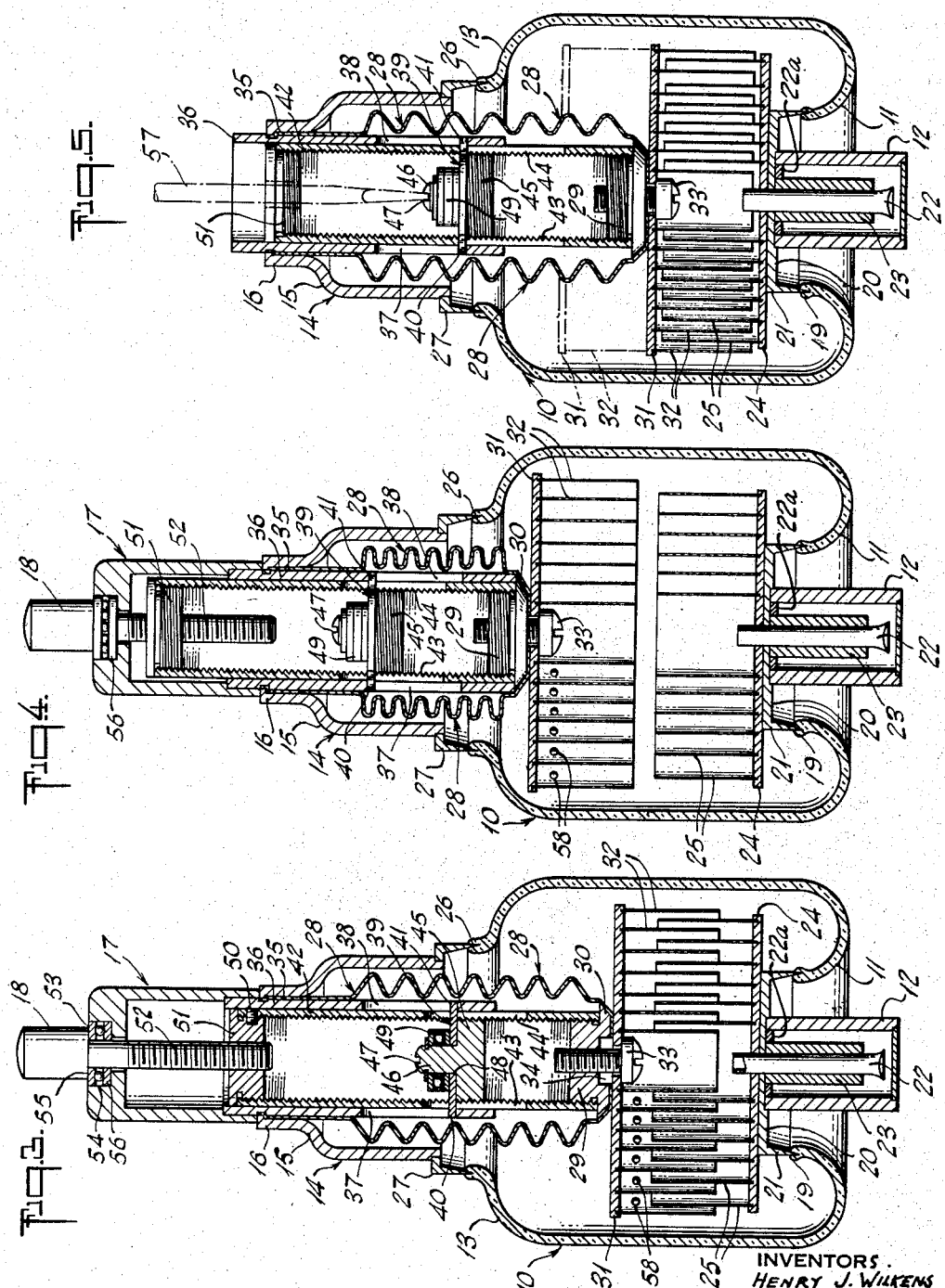

United States Patent Office 2,889,501
Patented June 2, 1959

2,889,501

HIGH VOLTAGE VARIABLE VACUUM CAPACITOR

Henry J. Wilkens and Louis Dolinko, Ridgefield, N.J., assignors to Vacap Corporation, Union City, N.J., a corporation of New Jersey Application May 3, 1956, Serial No. 582,425

8 Claims. (Cl. 317—245)

This invention relates to electrostatic capacitors and more particularly it relates to vacuum capacitors of the high voltage adjustable electrostatic capacity kind.

A principal object of the invention is to provide an improved high voltage vacuum capacitor which can be readily and accurately adjusted to any desired capacity between a preset minimum and preset maximum.

Another object is to provide an improved high voltage adjustable vacuum capacitor having means to adjust the minimum and maximum settings of the capacitor, and separate means to adjust the capacity to any value between said minimum and maximum. As a result of this feature the said minimum and maximum can be set at the factory or at a point of installation, and the adjustability between the preset maximum and minimum can be readily made at any time.

A feature of the invention relates to a high voltage vacuum capacitor which is provided with a novel longitudinal adjustable shaft for varying the capacity.

A further feature relates to a high voltage vacuum capacitor having a glass enclosing bulb or envelope with a metal header sealed into one end of the bulb and with a reentrant seal or cup seal, and which header directly carries the fixed or stationary plates of the capacitor, the movable plates being carried by an expansible metal bellows which is vacuum-tight sealed through the opposite end of the bulb; in conjunction with novel adjusting means for setting the minimum and maximum capacity of the device, and with separate means for readily adjusting the device to any desired value between the preset minimum and maximum.

Another feature relates to a high voltage vacuum capacitor of the kind employing an expansible metal bellows which is vacuum-tight sealed within a glass bulb and wherein novel means are provided for effecting a variation in the capacity of the device, together with means to preset the minimum or maximum capacity while avoiding the likelihood of the movable condenser plates short-circuiting with the stator plates.

A still further feature relates to the novel organization, arrangement and relative location and interconnection of parts which cooperate to provide an improved high voltage electrostatic capacitor of the vacuum kind.

Other features and advantages not specifically enumerated will appear as the ensuing descriptions progress.

In the drawing, which shows by way of example one preferred embodiment,

Fig. 1 is an exploded view of parts of the capacitor showing the manner of assembly;

Fig. 2 is a perspective view of the completed device;

Fig. 3 is a longitudinal sectional view of Fig. 2 showing the capacitor in one of its intermediate capacity settings;

Fig. 4 is a longitudinal sectional view similar to Fig. 3, showing the minimum adjusted capacity setting of the device;

Fig. 5 is another view, similar to Fig. 3, showing the maximum capacity setting of the device.

Referring to Figs. 1 and 2 of the drawing, the capacitor comprises an evacuated glass bulb 10, preferably of cylindrical shape, having at one end a reentrant lip 11, and to which is attached a hollow tubular metal ferrule 12. Ferrule 12 constitutes one of the contact members for the device and is electrically connected to the stator or fixed plates of the condenser. The opposite end of the bulb is provided with a tapered portion 13 which has a lip 26 into which is vacuum-tight sealed the tapered feather edge lip 27, which is welded or brazed to a cylindrical metal housing 14 which has a tapered portion 15 terminating in a cylindrical collar 16. Fitted on to the collar 16 is an inverted metal cylindrical ferrule 17 through which passes the adjusting shaft 18. The metal housing 14 is the other contact of the capacitor and is electrically connected to the set of movable plates 32 of the capacitor.

One of the advantages of such overall construction is that the leakage path between the two terminals 12 and 14 is substantially increased by the reentrant location of the ferrule 12.

As shown in Figs. 1, 3, 4 and 5, the reentrant neck 11 has a lip 19 into which is sealed vacuum-tight a metal disc 20. Disc 20 has a downwardly depending tapered or feather edge 21 which is sealed into the lip 19. This constitutes the well known tapered or Housekeeper seal.

Brazed or otherwise vacuum-tight sealed through the center of disc 20 is a long metal tubulation 22 through which bulb 10 can be evacuated. After evacuation and processing of bulb contents, the end of tubulation 22 is pinched and sealed off in any well known manner. The contact ferrule 12 is comprised of several parts which can be prefabricated as a separate sub-assembly. These parts are contact ferrule 12, locating washer 22a, rigid metal protecting sleeve 23, and tubulation 22. The contact ferrule 12, sleeve 23, locating washer 22a, and exhaust tubulation 22 are also brazed or welded to disc 20. By using a pinched-off metal exhaust tubulation, the capacitor as a whole is improved as compared with conventional glass tubulations which may project a considerable distance beyond the bulb and are subject to being broken by even relatively slight shocks or jars. Where glass tubulations are employed care must be taken to mount the capacitors so that the relatively fragile glass tubulation is well out of the way of associated circuit components. Furthermore, by enclosing the metal exhaust tubulation 22 in the metal housing 12, the liability of corona discharge from the very sharp edges of the pinched tubulation are avoided.

Brazed or otherwise rigidly fastened to the inner face of disc 20 is another large circular disc 24. Brazed or welded to one face of disc 24 is a plurality of concentric nested cylindrical metal capacitor plates 25 which constitute the stator of the condenser. While the drawings show six such stator plates, it will be understood that a greater or less number may be employed in accordance with the maximum capacity for which the condenser is designed.

Located within the bulb and arranged to be longitudinally extended therein is a metal bellows or Sylphon 28. The lower or closed end of the bellows into which the internally and externally threaded plug 29 is inserted, has a pierced hole through which screw 33 penetrates and into plug 29. Also brazed or welded vacuum-tight to the lower end of the bellows is a circular metal disc 31. Disc 31 has brazed or welded thereto a plurality of concentric nested cylindrical metal plates 32 which constitute the movable plates of the capacitor. Also brazed or welded to the disc 31 is a screw 33, which mechanically fastens and aligns plug 29, bellows 28 and disc 31. Plug 29 has a recess 34 into which can be loaded a ring of brazing material, and also a brazing ring may surround the contacting area of bellows 28 and disc 31. After the assembly (disc 31, movable cylindrical plates 32, and screw 33) has thus been centered with respect to the bellows 28 and plug 29, the parts can then be heated to brazing temperature. The brazing ring in recess 34, therefore, vacuum-tight seals the threaded joint between screw 33, plug 29, and bellows 28. The brazing ring surrounding the end of bellows 28 and disc 31 also vacuum-tight seals bellows 28 to disc 31.

The opposite uncorrugated cylindrical end 35 of the bellows is located between the collar 16 of the housing 14 and a cylindrical metal sleeve 36. The vacuum-tight joint between the elements 16, 35 and 36 can be brazed or welded, thus firmly anchoring the upper end of the bellows to the housing 14. Preferably the upper end of sleeve 36 extends beyond the collar 16 so as to telescopically receive the ferrule 17.

The sleeve 36 is provided with two diametrically opposite and parallel windows or slots 37, 38 which cooperate with a follower member 39 to control the longitudinal extension and contraction of the bellows. As shown more clearly in Fig. 1, the follower 39 has a pair of diametrically opposite lugs 40, 41 which fit within the respective slots 37, 38. The follower 39 cooperates with the slots 37, 38 to determine the minimum and maximum capacity settings of the plates 32 with respect to the plates 25.

In order to adjust the capacitor to any desired intermediate setting between its preset minimum and maximum, there is provided another metal sleeve 42 which is internally threaded and threaded onto the externally threaded periphery of the plug 29. Sleeve 42 is provided with a pair of diametrically opposite parallel slots or windows 43, 44 which are in registry with the slots 37, 38 in sleeve 36. The entire inner face of sleeve 42 is threaded so as to receive an externally threaded plug 45. Plug 45 has a central boss 46 having a slotted head 47 to receive a screwdriver or similar tool for adjusting the threaded position of the plug 45 within the sleeve 42. The boss 46 passes freely through a central opening 48 in the follower member 39 and the said follower member is held against the plug 45 by a suitable anti-friction end thrust bearing 49 and by a split locking ring 49a. Thus by turning the boss 46 the plug 45 can be located within the sleeve 42 at any desired position. In Fig. 3 of the drawing the plug 45 has been turned so that the lugs 40 and 41 of the follower abut against the lower ends of the slots 37, 38. This determines the maximum capacity setting of the condenser, as will be described hereinbelow in connection with Fig. 5.

One of the advantages of the above-described slotted sleeve adjusting arrangement is that the sleeve 42 cannot become loose, and short-circuiting between the stator and movable plates is thereby avoided. Furthermore, if for any reason the internal threads of plug 51 should become stripped or damaged, it can be easily removed without danger of short-circuiting between the stator and movable plates. Furthermore the lug and slot adjustment prevents twisting or torsioning of the bellows should screw 18 bind in plug 51.

Metal plug 51 has a central threaded opening to receive the threaded portion 52 of the adjusting shaft 18, and also an external thread which is screwed into sleeve 42, and locked in place by a set screw 50. A suitable anti-friction end thrust bearing 53 is located between the flat shoulder of the shaft 18 and the bottom flat wall of the recess in the upper end of ferrule 17. This thrust bearing may comprise a ball bearing ring 54 sandwiched between metal washers 55 and 56.

Since the lugs 40 and 41 of the follower member pass through the slots 37 and 38 in the sleeve 36, turning movement of the shaft 18 is converted into longitudinal movement of the sleeve 42. In other words, by turning the shaft 18, the bellows 28 can be contracted or expanded, thus changing the amount of overlapping relation between the movable plates 32 and the stator plates 25. There is thus provided a precise adjustment for the capacity of the device.

In some cases it is desirable to be able to preset the over-all range of the condenser variation at the factory or at the point of installation, so that unauthorized personnel cannot change those settings accidentally. This presetting of the over-all range is controlled by means of the plug 45 and thus the preset or setting of the plates can be given any desired value. For example, in Fig. 3 the condenser is shown with its maximum setting, wherein the member 45 has been previously adjusted so that these stop lugs engage the lower ends of the slots 37 and 38 and prevent further meshing of the plates. If it is desired to increase this maximum setting, the shaft 18 can be unscrewed and the ferrule 17 removed. Thereupon a screwdriver 57 or similar tool can be inserted so as to turn the member 45, as indicated in Fig. 5, which results in a further adjustment of the overlapping relation between the fixed and movable plates. When this maximum setting has been obtained, the ferrule 17 can be replaced and the shaft 18 can be threaded into the plug 51 and the shaft 18 can be turned to any desired extent until the stop lugs 40 and 41 engage the upper ends of their slots 37 and 38 which determines the minimum setting of the condenser, as shown in the view of Fig. 4.

One of the advantages of the above-described method of adjusting is that the maximum and minimum capacity can be adjusted very precisely. The stop lugs 40 and 41 permit the closest possible approach between the lower edges of the plates 32 and the disc 24 without danger of clashing therebetween when the shaft 18 is removed, under which condition the bellows is subjected to the full external atmospheric pressure.

In order to facilitate the evacuation of the spaces between the relatively closely adjacent cylindrical plates on the stator and the movable plates, each of those plates may be provided with a small perforation 58 for that purpose.

Various changes and modifications may be made in the disclosed embodiment without departing from the spirit and scope of the invention.

What is claimed is:

1. A variable capacitor of the high voltage kind, comprising an enclosing glass envelope, a metal support sealed vacuum-tight into one end of the envelope, a plurality of stator plates carried by said member, a plurality of movable plates adapted to be adjusted into nested overlapping relation with said stator plates, means to support said movable plates for longitudinal movement towards and away from said stator plates, the last-mentioned means including a bellows member sealed vacuum-tight through the opposite end of said envelope and with its inner end vacuum-tight closed and attached to said movable plates, means external to said envelope for adjusting the extension and contraction of said bellows, and separate adjustable means to limit the minimum and maximum overlapping of said stator and movable plates, the last mentioned means including a first sleeve member having a longitudinal slot and mechanically connected to the bellows, a second sleeve member telescoped with relation to the first sleeve member and also having a longitudinal slot in registry with the slot in the first sleeve, a limit control member carried by said first sleeve and having a projection extending through both said slots, and means for continuously adjusting said limit control member to any desired setting between two limits to determine the said minimum and the said maximum overlapping of said stator and movable plates.

2. A variable capacitor of the high voltage kind, comprising an evacuated enclosing envelope, a metal member sealed vacum-tight into one end of the envelope, a set of stator plates attached to said member, a metal bellows member extending through the opposite end of the envelope, vacuum-tight sealing and supporting means for said bellows member, a set of movable plates connected to and movable with said bellows member, a first cylindrical sleeve fixedly united to the envelope and telescoped within said bellows member, a second cylindrical sleeve slidably mounted within the first sleeve, means external of the envelope and connected to said second sleeve for adjusting the extension and contraction of said bellows, each of said sleeves having a longitudinal slot with the slots in registry, and separate adjustable means to limit the minimum and maximum overlapping of said stator and movable plates, the last mentioned means including a stop member carried by the second sleeve member and adjustable along the length of said second sleeve member independently of said external means, said stop member having a portion extending through both of said slots to determine said limits, and means to adjust said stop member on said second sleeve member to determine the said minimum and maximum limits independently of said external means.

3. A variable capacitor of the high voltage kind, comprising an evacuated enclosing envelope, a metal member sealed vacuum-tight into one end of the envelope, a set of stator plates attached to said member, a metal bellows member extending through the opposite end of the envelope, a set of movable plates connected to and movable with said bellows member, vacuum-tight sealing and supporting means for said bellows member, a first cylindrical sleeve fixedly united to the envelope and telescoped within said bellows member said first sleeve having a longitudinal slot, a second cylindrical sleeve slidably mounted within the first sleeve, said second cylindrical sleeve having a longitudinal slot in registry with the first mentioned slot, means external of the envelope and connected to said second sleeve for adjusting the extension and contraction of said bellows, the last mentioned means including a threaded shaft, a threaded follower for said threaded shaft and fitted within one end of said second sleeve, the opposite end of said second sleeve being vacuum-tight joined to the inner end of said bellows, a thrust bearing for said threaded shaft whereby turning of said shaft causes said follower to move said second sleeve longitudinally to control the extension and contraction of said bellows member, and a limit stop member adjustably carried by said second sleeve and having a portion extending through both of said slots to provide a continuous adjustment for determining the minimum and maximum overlapping of said stator plates and said movable plates independently of said external means.

4. A variable capacitor of the high voltage kind, comprising an evacuated enclosing envelope, a metal member sealed vacuum-tight into one end of the envelope, a set of stator plates attached to said member, a Sylphon extending through the opposite end of the envelope, vacuum-tight sealing and supporting means for said Sylphon, a first cylindrical sleeve fixedly united to the envelope and telescoped within said Sylphon, a second cylindrical sleeve slidably mounted within the first sleeve and connected at one end to said Sylphon, means external of the envelope and connected to said second sleeve for adjustably telescoping it with relation to the first sleeve for adjusting the extension and contraction of said bellows, each of said sleeves having a respective elongated slot with the slots in registry, a limit stop member connected to said second sleeve and extending into the elongated slot in the first sleeve to limit the maximum and minimum extension of said Sylphon, and means to adjust the position of said stop member to any desired setting between two limiting settings and independently of said external means for determining the minimum and maximum capacity of the condenser.

5. A vacuum capacitor according to claim 4, in which said stop member is carried by said second sleeve and is provided with means to adjust its normal position along the length of said second sleeve, said stop member having a stop lug extending through the said registering slots in both of said sleeves.

6. A variable capacitor of the high voltage kind, comprising an evacuated enclosing glass envelope having a reentrant wall at one end, a metal header sealed vacuum-tight to the inner end of said reentrant wall, a plurality of stator plates rigidly fastened to said header, a tubular metal member vacuum-tight sealed to the opposite end of said envelope, a metal Sylphon extending into said envelope having one end vacuum-tight sealed to said tubular metal member, a first internally threaded metal sleeve fastened to the opposite end of said Sylphon, a threaded bushing fixedly mounted within said sleeve, a metal ferrule carrying a thrust bearing, a threaded adjusting shaft passing through said bearing and threaded into said bushing for moving said internally threaded sleeve longitudinally to extend and contract said Sylphon, a second metal sleeve rigidly united to said tubular metal member and within which the first-mentioned sleeve is slidably telescoped, an elongated slot in the first sleeve, an elongated slot in the second sleeve, said slots being in registry, a second bushing threaded internally of the first-mentioned sleeve and having means for adjustably positioning said second bushing longitudinally of said first sleeve, a limiting stop member connected to said second bushing and movable only in a longitudinal direction as said second bushing is adjustably positioned in said first sleeve, said limiting stop member extending through both of said slots and determining by the adjusted setting of said second bushing in said first sleeve, the minimum and maximum extensibility of said Sylphon and thereby to determine the minimum and maximum capacity of the capacitor.

7. A capacitor according to claim 6, in which said second bushing is located within said first sleeve and is provided with independent adjusting means to preset said limiting stop member independently of said threaded adjusting shaft.

8. A vacuum capacitor according to claim 7, in which each of said sleeves has a pair of diametrically opposite slots in alignment and said stop member includes a pair of diametrically extending stop lugs which extend through said diametrically opposite slots, whereby said stop member is restrained against rotary movement as said second bushing is adjustably threaded into said internally threaded sleeve.

References Cited in the file of this patent

UNITED STATES PATENTS

| | | |
|---|---|---|
| 1,567,067 | Lindberg | Dec. 29, 1925 |
| 2,511,338 | Jennings | June 13, 1950 |
| 2,740,926 | Jennings | Apr. 3, 1956 |
| 2,740,927 | Jennings | Apr. 3, 1956 |